United States Patent

[11] 3,609,015

| | | |
|---|---|---|
| [72] | Inventor | Jules Messinger<br>Weinbergstrasse 74, 8006 Zurich, Switzerland |
| [21] | Appl. No. | 850,367 |
| [22] | Filed | Aug. 15, 1969 |
| [45] | Patented | Sept. 28, 1971 |
| [32] | Priority | Aug. 27, 1968 |
| [33] | | Switzerland |
| [31] | | 12,973/68<br>Continuation-in-part of application Ser. No. 833,900, June 13, 1969, now abandoned. |

[54] HAIRSTYLING AND MAKEUP MIRROR DEVICE
4 Claims, 11 Drawing Figs.

[52] U.S. Cl. .................................................. 350/298,
248/467, 287/90 C, 351/50
[51] Int. Cl. ......................................................... G02b 7/18,
G02c 7/14
[50] Field of Search ............................................ 350/288,
298; 351/50, 41, 158; 248/467, 483; 287/90 C

[56] References Cited
UNITED STATES PATENTS
2,510,634  6/1950  Hull ............................. 248/467 UX
2,606,479  8/1952  Howe .......................... 350/298

FOREIGN PATENTS
880,999  11/1961  Great Britain ................ 350/288

*Primary Examiner*—David Schonberg
*Assistant Examiner*—John W. Leonard

ABSTRACT: A novel hairstyling and makeup mirror device is disclosed, the device including a frame adapted to be worn about the the eyes of the user, similar to an eyeglass frame. A normal or flat or, if desired, even a magnifying mirror is attached to the front or forehead bar portion of the frame by means of an elongated rod which may be telescopically constructed. One end of the rod is preferably pivotally attached to the mirror while the other end of the rod is pivotally attached to the frame, the pivotal connection at the frame in the preferred embodiment comprising a magnetically operable ball and socket joint. With the novel device, the mirror is displaceable to virtually any position relative to theeyes of the user such that when the user stands with his back toward a fixed mirror, the back of the head can be viewed so as to facilitate hairstyling. Alternatively, the mirror can be displaced into a position so as to provide a reflection of the viewer's eyes to facilitate the application of eye makeup or other cosmetic operations.

PATENTED SEP 28 1971

INVENTOR.
JULES MESSINGER
BY Jacobi, Davidson & Kleeman
ATTORNEYS

INVENTOR.
JULES MESSINGER
BY Jacobi, Davidson & Klare
ATTORNEYS

HAIRSTYLING AND MAKEUP MIRROR DEVICE

BACKGROUND OF THE INVENTION

This application is a continuation-in-part of U.S. application Ser. No. 833,900, filed June 13, 1969 now abandoned.

The instant invention disclosed herein generally relates to mirror devices and particularly concerns a portable hairstyling and makeup mirror device adapted to be worn about the head of the user.

Fashionable hairstyles for women such as the so-called "French Twist," bouffant or chignon, to name but just a few, require styling and combing of the hair at or near the rear of the head. Since the rear of the head cannot easily be viewed when utilizing a single vanity or bathroom mirror without an undue amount of head twisting and the like, to maintain or place one's hair in such styles is a considerable task. Accordingly, it is a common practice for a women to place a second mirror opposite the main vanity or bathroom mirror in such a position and at such an angle that, through double reflection, the rear of her head is visible in at least one of the mirrors.

This double-mirror or reflection technique, as described, normally requires a precise and fixed attachment of the second mirror to some wall or door surface opposite the main vanity or bathroom mirror, and thus, while capable of producing satisfactory results at home, cannot readily be used to full advantage when traveling. Frequently, the dressing room or bathroom of a hotel, for example, is such that a suitable surface for placement of the second mirror cannot be found. Even if such a surface were available, the second mirror could only temporarily be secured thereto be means of nails or the like which would damage the wall or door surface and which would not, in fact, provide a stable enough attachment so as to maintain the second mirror in a precise position and at a desired angle.

Furthermore, it is frequently necessary for a woman to comb or "up" her hair while dining at a restaurant, attending a nightclub or while at work. Although it is common for women to carry a small mirror such as a compact or the like in their pocketbook, an attempt to use a double-reflection or double-mirror technique with such a second mirror so as to view and comb the hair at the rear of the head is almost futile. In a situation such as this, a woman would actually have to hold the second or compact mirror in her hand while standing with her back toward a restroom mirror and thus, both hands would not be free to style the hair. Additionally, the size of the mirror carried by a woman in her pocketbook must necessarily be small and this in and of itself limits the maximum visibility.

Portable mirror devices were thus developed in the prior art for use with a double-reflection technique in an attempt to provide a solution to some of the above hairstyling and combing problems. These devices were designed to be worn on the woman's person, preferably on or about her head, so as to free the hands and such that at least partial visibility of the rear of the head could be achieved in cooperation with some fixed vanity or bathroom mirror surface. These devices, however, have met with little success since oftentimes they have been of such size as to preclude placement in a pocketbook, have been uncomfortable to wear, failed to provide desirable adjustability of the mirror, and have not been able to provide total clear visibility of the rear of the head.

A representative example of such portable prior art hairstyling mirror devices provided a frame member similar to that of an eyeglass frame having a forehead bar, with the frame member being adapted to be worn about the woman's head. A small flat mirror was fixedly and nonadjustably disposed on the forehead bar at either side thereof with the mirrors extending outwardly yet still in the direction of the line of sight of the user. Thus, when the user of this prior art device placed herself with her back towards a fixed vanity mirror, a partial reflection of the rear of her head could be seen in one or the other of the two mirrors provided on the frame. Thus, both hands of the woman remained free for effecting the hairstyling. However, the two side mirrors provided were relatively small, were positioned far too close to the eyes of the user and could not be positionally adjusted. The reflection of the rear of the head could be seen in each instance only with one eye rather than with both eyes. Since the mirrors of this prior art device were solidly fixed to the frame, full visibility of the rear of the head could be achieved only through a twisting or turning of the neck, and the device itself was cumbersome to carry and store.

SUMMARY OF THE INVENTION

Thus, a need still exists for a portable hairstyling device which eliminates the disadvantages associated with prior art devices and which satisfactorily provides a solution to the hairstyling problems discussed above. It is the primary object of the instant invention to provide a device which effectively satisfies this need.

Further, more specific yet equally important objects of the instant invention are:

The provision of a mirror device which can be worn about the head of the user in an extremely comfortable manner;

The provision of a mirror device which is truly portable so as to easily be carried in a woman's handbag, for example;

The provision of a mirror device which, without necessitating head turning or twisting, allows full and complete visibility of the rear of the user's head via a double-reflection technique in conjunction with a fixed vanity or bathroom mirror;

The provision of a mirror device which, in addition to facilitating hairstyling, also functions in a manner so as to facilitate the application of eye makeup or other cosmetics;

The provision of a mirror device which can be displaced into virtually any position and at virtually any distance with respect to the eyes of the user;

The provision of a mirror device wherein the mirror always remains at or about eye level and near the eyes so as to afford good reflective vision while still maintaining a relatively small physical dimension;

The provision of a mirror device of the type described which is lightweight and relatively indestructible; and The provision of a mirror device of the type described which is relatively simple in construction and in manufacture and thus relatively inexpensive to produce.

These objects as well as the other objects and advantages which will become apparent as the description proceeds, are implemented by the novel hairstyling and makeup mirror device of the instant invention which will be seen to comprise, as its general constituent parts, a frame means or member adapted to be worn about the head of the user in a fashion similar to an eyeglass frame, a small compact mirror either of normal flat or of magnifying construction, and a connecting means for securing the mirror means to the frame means in a fashion such that the mirror means is fully positionally displaceable and adjustable both laterally and vertically relative to the frame means.

In an exemplary, preferred embodiment, the connecting means utilized comprises an elongated rod, either of fixed length, or of telescopic adjustable length, if desired, which rod is coupled at one end thereof to the frame means via a pivotal coupling, the other end of the rod being secured to the mirror means, preferably via a further pivotal coupling. The pivotal coupling between the rod and the frame means preferably comprises a ball and socket joint and provides the advantage that the rod can sweep through a 360° arc so as to define the generatrix of an imaginary cone. The mirror means itself is thus displaceable relative to the frame means into virtually any position in the $r$ $\theta$, and $\Phi$ directions of a standard three-dimensional spatial polar coordinate system.

Due to the pivotal coupling between the mirror means and the frame means, the entire device can be folded in a fashion so as to markedly reduce its size enabling easy portability. When the device is used, the frame means are placed about the head of the user and the mirror is moved into any desired position so as to afford rear visibility in conjunction with a fixed mirror. Alternatively, the mirror can be brought toward the face itself or otherwise adjusted such that a direct reflection of the face and the eyes as would be required when applying eye makeup or other cosmetics can readily be achieved.

BRIEF DESCRIPTION OF THE DRAWINGS

The invention itself will be better understood and further advantageous features thereof will become evident from the following detailed description of preferred inventive embodiments, such description referring to the appended sheets of drawings, wherein.

DETAILED DESCRIPTION OF PREFERRED INVENTIVE EMBODIMENTS

Figure 1:
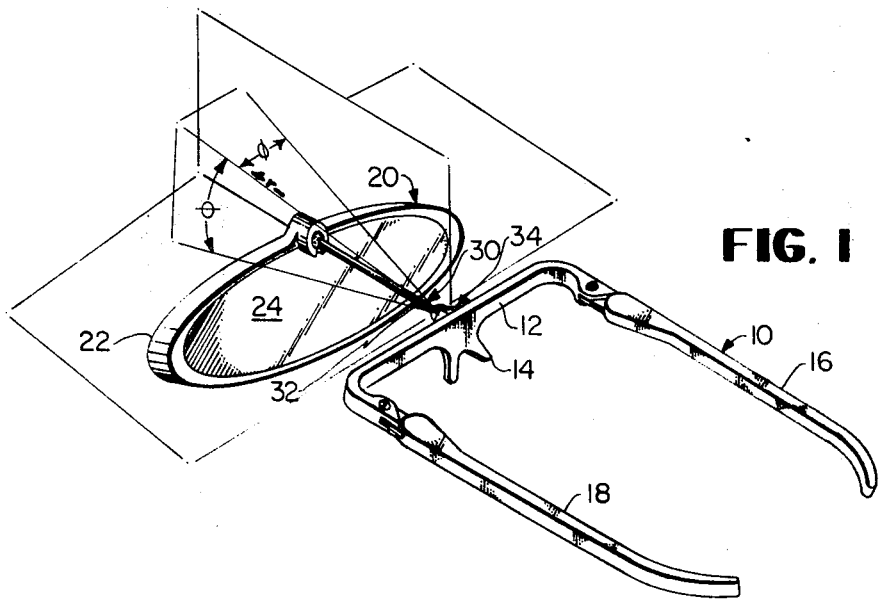
FIG. 1 is a perspective view of one preferred embodiment of the inventive hairstyling and makeup mirror device, this figure schematically illustrating the relative freedom of movement of the mirror means in a three-dimensional spatial polar coordinate system.
Figure 5:
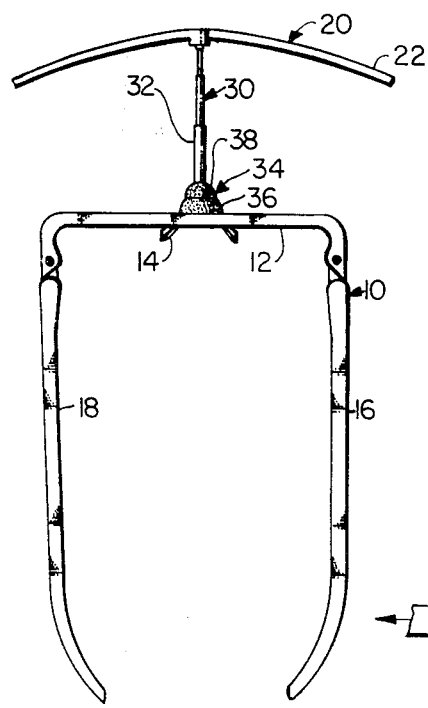
FIG. 5 is a plan view of an additional embodiment of the novel mirror device utilizing a curved mirror and a telescopic connecting rod.

Referring now to the drawings, and particularly to FIG. 1 thereof, an overall perspective view of a preferred inventive embodiment of the novel mirror device is depicted. The device can be seen to generally comprise a frame means 10 adapted to be worn about the head of a user, a mirror means 20, and connecting means 30 for securing the mirror means 20 to the frame means 10 such that the mirror means is essentially freely displaceable relative to the frame means. The frame means itself is generally similar to the frame provided for eyeglasses and includes a forehead bar 12 having a nose piece 14 attached centrally thereof and two lateral bows 16 and 18 extending rearwardly of the forehead bar 12 and hingedly attached to either end thereof. The mirror means 20 preferably includes an elliptical rim 22 in which a reflecting surface 24 is inserted. The rim 22 and the reflecting surface 24 may either be flat as depicted in FIG. 1 or of panoramic, curved construction such as depicted in FIG. 5, with the reflecting surface 24 either being formed of glass or some other suitable synthetic material.

Figure 4:
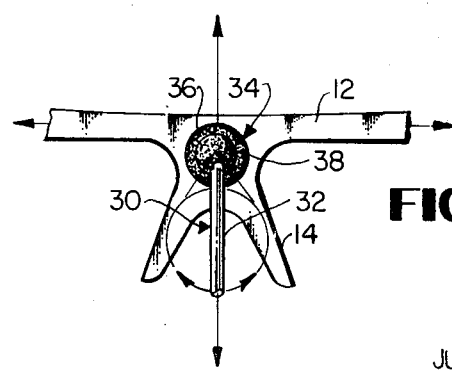
FIG. 4 is perspective view, partially broken away for illustrative clarity, of the pivotal coupling means provided at the frame member of the device of FIG. 1, this pivotal coupling means securing the connecting rod to the frame member such that the connecting rod can sweep through a 360° arc with the rod thus defining the generatrix of an imaginary cone.

Since the the novel mirror device is intended to provide an image of the rear of the wearer's head in conjunction with a fixed vanity or bathroom mirror and without necessitating twisting or turning of the user's head, the free displaceability of the mirror means 20 relative to the frame means 10 alluded to above is of utmost importance. To this end, the connecting means 30 disposed between the mirror means 20 and the frame means 10 preferably comprises an elongated rod or bar 32 secured to the mirror means 20 at one end thereof and pivotally coupled at the other end thereof by means of a pivotal coupling means or joint 34 to the forehead bar or member 12 of the frame means 10. Pivotal coupling means 34 as can best be seen in FIG. 4, for example, preferably comprises a ball and socket joint having a socket member 36 either adhesively secured to the frame 12 or molded therein and a ball member 38 fixedly attached to the rod 32. The placement of the ball and socket joint 34 on the frame means 10 is such that the line of sight of the eyes of the user which normally passes beneath the forehead bar member 12 of the frame means is approximately at the same height as is the reflecting surface 24 of the mirror 20. By virtue of the pivotal and preferably ball and socket coupling between the rod 32 and the frame 10, rod 32 itself can sweep through a 360° arc so as to thus define the generatrix of an imaginary cone. The mirror means 20 secured to the other end of rod 32 can thus be moved or displaced in the $\theta$ and $\Phi$ directions of the three-dimensional spatial polar coordinates system superimposed in the view of FIG. 1. The rod 32 can be of fixed length such as depicted in FIG. 1 determined by the close average focal length of the eyes, or can be of adjustable length by means of a telescopic construction such as depicted in FIG. 5. When rod 32 is telescopically constructed, mirror means 20 is also capable of moving in the $r$ direction of the three-dimensional polar coordinate system so as to be capable of being positioned at virtually any point in space within the limitations of the mechanical construction of the connecting means 30.

Figure 2:
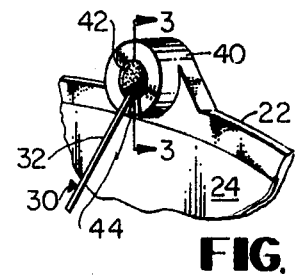
FIG. 2 is an enlarged perspective view, partially broken away for illustrative clarity of the pivotal coupling means provided at the mirror of the device of FIG. 1, such pivotal coupling means connecting the mirror to a connecting rod.
Figure 3:
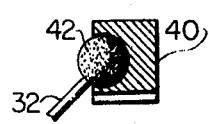
FIG. 3 is a sectional view of the pivotal coupling means provided at the mirror, this view being taken along lines 3—'of FIG. 2.

In the preferred inventive embodiment, the connection of the rod 32 to the mirror means 20 is also pivotal in nature and additionally may comprise a ball and socket joint such as depicted in FIGS. 2 and 3. With this coupling, the reflecting surface 24 of the mirror means 20 can also be canted or tilted after the mirror itself has been placed into a given position. In this fashion, visibility of the rear of the user's head is even further facilitated and the portability of the overall device is even more greatly assured since the device can be completely folded up to a compact package in the manner to be described hereinbelow.

Referring to FIG. 2, for example, a preferred construction of the pivotal coupling means provided between the connecting rod 32 and the mirror means 20 is depicted and will be seen to comprise a socket member or portion 40, preferably constructed of plastic or some other resilient material, molded into the rim 22 of the mirror 20. The end of the rod 32 adjacent the mirror means 20 is thus preferably provided with a hard or metallic ball member 42 which can be resiliently inserted into the socket member or portion 40. As shown in FIG. 3, the ball member 42 when inserted into socket 40 would be maintained therein since the equator of the ball lies beneath the outside surface of the socket. Ball 42 preferably has a roughened outer surface so as to increase the holding friction of the joint. So as to aid the portability of the overall device, a slot 44 is provided on the lower side of the socket member 40 such that the rod 32 can be folded flat against the face or reflecting surface 24 of the mirror 20 while the rod itself would be folded either downwardly or to the side with respect to the frame 10 by means of the pivotal joint 34 provided therebetween.

Figure 6:
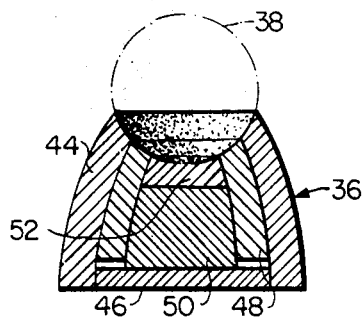
FIG. 6 is a sectional view of the socket portion of the pivotal coupling means provided between the frame member and the connecting rod of both the embodiments of FIGS. 1 and 5.
Figure 7:
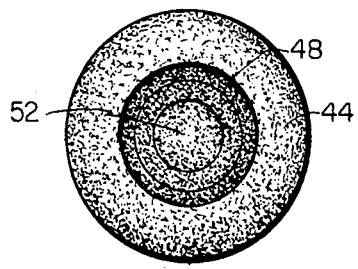
FIG. 7 is a top plan view of the socket member of FIG. 6.

In the preferred form of the invention, the ball and socket joint 34 provided between the connecting rod 32 and the forehead bar or member 12 of the frame 10 exhibits a magnetic holding action. To this effect, and as depicted in FIGS. 6 and 7, the socket portion 36 of the pivotal joint, which portion is fixedly secured to the forehead bar 12, is constructed so as to include an outer casing 44 and a lower plate 46 of ferromagnetic material, the outer casing 44 preferably being circular in construction. An inner concentric ring 48 of a nonmagnetic material such as brass serves to house an internal permanent magnet 50 and the ferromagnetic slug 52 is placed over the magnet. As shown, the upper surfaces of each of the elements 44, 48 and 52 are curved so as to define a rounded, smooth socket into which the ball member 38 is placed. As should be apparent, when the ball member 38 is not in the socket, a complete magnetic loop between the north and south poles of permanent magnet 50 cannot be maintained due to the high reluctance of the brass ring 48. However, when the ball member 38, which is constructed of ferromagnetic material in this example is placed in the socket, a magnetic path exists between the top of the magnet 50, through ferromagnetic material 52, through the ball member 38, down the ferromagnetic ring 44, through the ferromagnetic plate 46, back into the other pole of the magnet 50. Thus, the magnetic socket exhibits a very high magnetic holding force eliminating undesirable rotational movement of the ball member 38. Additionally, since the surface of ball member 38 is also roughened, the magnetic holding force is aided by means of the frictional holding force so produced.

Since the ball member 38 is primarily retained in the socket 36 through a magnetic force, the depth of the socket 36 can be relatively shallow such that the equator of the ball 38 extends outside the surface of the socket member 36. In this fashion, greater mobility of the connecting rod 32 and the mirror means 20 attached thereto is ensured, and in fact, the connecting rod and mirror can even be folded back toward the frame.

Figure 8:
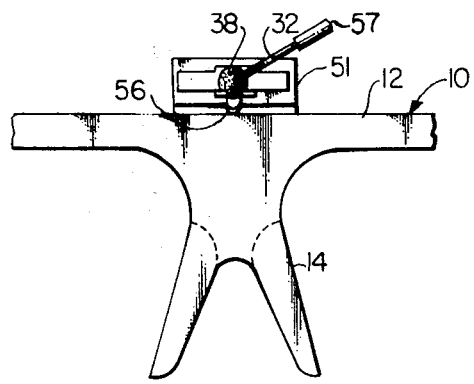
FIG. 8 is a perspective view of a further embodiment of a pivotal coupling means utilized between the frame member and the connecting rod.
Figure 9:
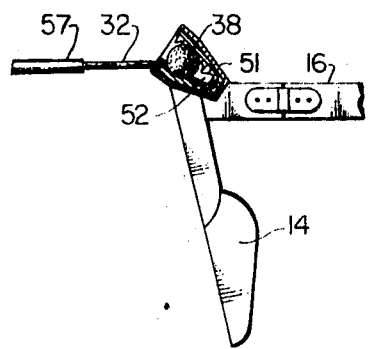
FIG. 9 is an elevational view, partially in section, of the pivotal coupling means depicted in FIG. 8.

Notwithstanding the manifold advantages of a magnetic ball and socket member provided between the elongated rod 32 and the forehead bar 12 of the frame means 10, the instant invention further contemplates variants of such a ball and socket arrangement. One such variant is depicted in FIGS. 8 and 9 wherein a casing member 51 is attached to the forehead bar 12 of the frame means 10 centrally thereof above the nosepiece 14. The bearing piece or casing 51 includes a flexible leaf spring 52 at the inside thereof and the ball 38 of the elongated rod 32 is seated in a circular recess of the metal spring clamp 52. A slit 56 is provided at the underside of the bearing piece 51 such that the ball 38 and rod 32 can be folded back towards the frame 10 so that the device can be folded together when not in use so as to be stored in a small space, such as a handbag. If desired, a protective sheath 57 such as rubber tubing can be placed over the connecting rod 32 so as to protect reflecting surface 24 of the mirror means 20 from damage when the mirror itself is folded against the rod for storage.

Figure 10:
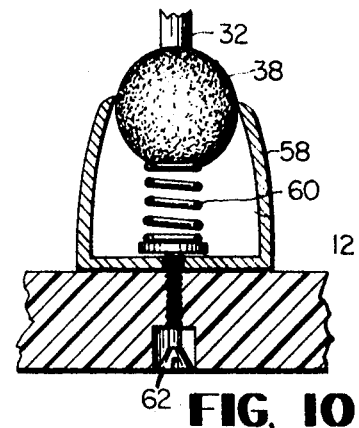
FIG. 10 is an elevational view, partially in section, of a still further embodiment of a pivotal coupling means suitable for coupling a connecting rod to the frame of the mirror device of the instant invention; and, FIG. 11 is a perspective view of still another suitable pivotal coupling means.
Figure 11:
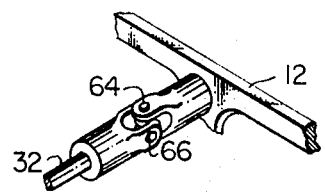

A further variant of a pivotal coupling means suitable for use between the rod and the frame of the instant invention is depicted in FIG. 10 and it will be seen to comprise a housing 58 secured to the forehead bar 12 of the frame means in any suitable fashion. The ball member 38 attached to the rod 32 is seated within the housing 58 such that the equator of the ball member 38 will lie below the outside opening of the housing. An upward pressure is exerted on the ball member 38 by means of spring 60, the tension of which can be adjusted by turning screw 62. In this fashion, the frictional holding power of the roughened ball surface against the opening of the housing 58 can be controlled. A still further variant of the pivotal coupling means between the rod and the frame of the instant invention is seen in FIG. 11 and comprises a so-called universal joint having mutually orthogonal pivotal axes. By tightening the screws 64 and 66 of the universal joint, its frictional holding power can be adjusted.

Although the magnetic ball and joint as well as the other variant pivotal joints as described are contemplated for use between the rod 32 and the forehead bar 12 of the frame means 10, it should be apparent that each of these pivotal coupling joints could also be provided between the connecting rod 32 and the mirror means 20 rather than utilizing the illustrated resilient ball and socket coupling of FIGS. 2 and 3. Alternatively, the resilient pivotal coupling of FIGS. 2 and 3 could likewise be provided between the rod 32 and the frame means 10 if so desired.

While the novel mirror device has primarily been described for use as an aid to hairstyling and the like, it should be readily apparent that such device has equal utility in facilitating the application of eye makeup or other cosmetics. In this instance, the reflecting surface 24 of the mirror means 20 desirably would be constructed as a magnifying surface so as to greatly magnify the reflected image of the eye or face of the user. Since the mirror means 20 is generally at eye level, the user thereof need merely look straight ahead when applying makeup.

As should now be apparent, the objects initially set forth at the outset of this specification have been successfully achieved.

What is claimed is:

1. A hairstyling and makeup mirror device comprising a frame member adapted to be worn about the head of the user, mirror means, connecting means for securing said mirror means to said frame means, said connecting means including a telescopic rod member pivotally attached at one end to said mirror means, and means for releasably pivotably coupling the other end of said telescopic rod member to said frame member such that said telescopic rod member can sweep through be 360° arc about a single pivot point located at the region of said frame member in a manner that said telescopic rod member thus defines the generatrix of an imaginary cone, said means for releasably pivotably coupling said other end of said telescopic rod member to said frame member comprising mechanism defining a ball and socket joint, said mechanism including a casing containing magnetic means secured to one of said members and a ball member secured to the other of said members, said ball and socket joint being releasable so that said telescopic rod member can be detached from said frame member, to permit separate storage thereof during nonuse while providing a firm pivotable yet releasable connection between said telescopic rod member and said frame member during use thereof.

2. The hairstyling and makeup mirror device as defined in claim 1, wherein said casing containing magnetic means is secured to said frame member, and said ball member is fixedly secured to said telescopic rod member.

3. The hairstyling and makeup mirror device as defined in claim 2, wherein said casing containing said magnetic means comprises a hollow outer casing portion formed of magnetic material, said hollow outer casing portion having an upper end and lower end, said upper end being provided with a recess for receiving said ball member of said telescopic rod member, said magnetic means comprising a ferromagnetic slug located at the region of said upper end beneath said recess, a permanent magnet located beneath said ferromagnetic slug, a magnetic plate member disposed beneath said permanent magnet at the lower end of said hollow outer casing portion, and a ring of nonmagnetic material enclosing said ferromagnetic slug and said permanent magnet disposed within said hollow outer casing portion.

4. The hairstyling and makeup mirror device as defined in claim 1, further including means for releasably pivotably coupling said one end of said telescopic rod member to said mirror means, to thus enable total disassembly of the mirror means, the telescopic rod member and the frame member from one another to facilitate transport and storage of the hairstyling and makeup mirror device.